United States Patent [19]

Murakami

[11] Patent Number: 4,915,984
[45] Date of Patent: Apr. 10, 1990

[54] PROCESS FOR PRODUCING GRAPHITE FILMS AND FIBERS

[75] Inventor: Mutsuaki Murakami, Tokyo, Japan

[73] Assignees: Reserach Development Corp., Tokyo; Matsushita Electric Industrial, Osaka, both of Japan; a part interest to each

[21] Appl. No.: 205,580

[22] Filed: Jun. 7, 1988

Related U.S. Application Data

[63] Continuation of Ser. No. 886,292, May 23, 1986, abandoned.

[30] Foreign Application Priority Data

May 30, 1985 [JP] Japan .................................. 60-115417
Jun. 28, 1985 [JP] Japan .................................. 60-140207

[51] Int. Cl.$^4$ .......................... D01F 9/14; B29C 71/02
[52] U.S. Cl. .................................... 427/113; 264/29.1; 264/29.2; 264/29.5; 264/29.6; 264/29.7; 264/83; 264/101; 264/129; 264/234; 264/288.8; 264/290.5; 264/345; 423/448; 427/226; 427/227; 427/385.5
[58] Field of Search ................... 264/29.2, 29.5, 29.6, 264/29.7, 29.1, 83, 101, 129, 234, 288.8, 290.5, 345; 423/447.4, 447.5, 447.6, 448; 427/113, 226, 227, 385.5

[56] References Cited

U.S. PATENT DOCUMENTS

| 3,089,195 | 5/1963 | Woodburn, Jr. | 264/29.7 |
| 3,449,077 | 6/1969 | Stuetz | 423/447.6 |
| 3,528,774 | 9/1970 | Ezekiel et al. | 423/447.6 |
| 3,635,675 | 1/1972 | Ezekiel | 423/447.6 |
| 3,969,124 | 7/1976 | Stewart | 264/29.5 |
| 4,237,109 | 12/1980 | Hiramatsu et al. | 264/29.2 |
| 4,348,343 | 9/1982 | Akerberg et al. | 264/29.5 |

Primary Examiner—Hubert C. Lorin
Attorney, Agent, or Firm—Stephen F. K. Yee

[57] ABSTRACT

A process for producing almost perfect graphite films and fibers at lower graphization temperatures wherein a film or fiber of a polymer selected from a defined group is subjected to a preliminary heat treatment at a temperature of 400° to 700° C., under tension, in vacuo or in an inert gas, and then heat treating the film or fiber at a temperature of at least 1600° C. in vacuo or in an inert gas, to graphitize the film or fiber. The process can be modified to produce graphite films having excellent electric conductivity and mechanical properties, by heat treating a polymer selected from a second defined group at a temperature of at least 1800° C. in vacuo or in an inert gas, impregnating the film with a binder component, and then heat treating the impregnated film at a temperature of not more than 1400° C.

5 Claims, 1 Drawing Sheet

PROCESS FOR PRODUCING GRAPHITE FILMS AND FIBERS

This application is a continuation of Ser. No. 06/866,292, filed 5/23/86, now abandoned.

BACKGROUND OF THE INVENTION

(1) Technical Field

The present invention relates to a process for producing graphite films and fibers utilized in electrodes, heating elements, structures, gaskets for high-temperature and high-pressure instruments, heat-insulating materials, corrosion resistant sealing materials, brushes for electric use, X-ray monochromators and the like, particularly to a process for producing graphite films and fibers by heat treating a specific polymeric material as a starting material at a particular temperature.

(2) Background Information

Graphite holds an important position as an industrial material because of its outstanding heat resistance, chemical resistance, high electric conductivity and the like, and has been widely used as electrodes, heating elements and structures. Natural graphite may be used for such purposes. However, natural graphite occurs in an extremely limited amount and is intractable because of its powder or block form. Graphite has been, therefore, artificially produced.

Processes for producing such artificial graphite can be mainly classified into the following four processes.

In the first process, graphite is produced by separating from the melts of Fe, Ni/C system, decomposition of silicon carbide, aluminum carbide and so on, or cooling of the carbon melts under high temperature and high pressure. Graphite obtained in such manners is called Kish graphite, and has the same properties as those of natural graphite. According to this process, however, only a minute flake-like graphite is obtained. Therefore, together with the complexity of the manufacturing process and the expensive cost, this process has not been used for industrial production.

The second process is one in which various organic or carbonaceous materials are graphitized by heating at a temperature of at least 3000° C. In this process, graphite having the same physical properties as those of natural graphite or Kish graphite can not be obtained. For example, natural graphite and Kish graphite have an electric conductivity in the direction of a-axis, which is the most typical property of graphite, of from $1 \times 10^4$ S/cm to $2.5 \times 10^4$ S/cm. In contrast to this, only the product having an electric conductivity of from $1 \times 10^3$ S/cm to $2 \times 10^3$ S/cm can generally be obtained by this process. That is to say, this fact shows that graphitization does not proceed well in this process. However, the products obtained by this second process have been widely employed in such uses where a perfect graphite is not necessarily required, because of the simplicity of the manufacturing process. Therefore, if graphite having the properties similar to those of natural graphite can be obtained by this process, it can be said that the industrial meaning thereof is significantly important.

In the third process, graphite is produced by high-temperature decomposition, sedimentation and hot working of gaseous hydrocarbons, wherein annealing is effected at a temperature of 3400° C. under a pressure of 10 kg/cm$^2$ for a long period of time. Graphite thus obtained is called highly orientated pyrographite and has almost the same properties as those of natural graphite. For example, it has an electric conductivity in the direction of a-axis of $2.5 \times 10^4$ S/cm. According to this process, graphite of considerably large sizes can be prepared, unlike Kish graphite. This process has, however, disadvantages since the manufacturing process is complicated and the cost is expensive.

By the fourth process, natural graphite is immersed in a mixed solution of concentrated nitric acid and concentrated sulfuric acid, and thereafter the spacing between graphite layers is expanded by heating. Graphite thus obtained is called expanded graphite, and is powdery. Accordingly, it is further necessary to apply high-pressure press working to it in the presence of an adhesive, in order to make it sheet-like. Sheet-like graphite thus obtained is inferior to natural monocrystal graphite in properties. For example, the electric conductivity of sheet-like graphite is ordinary about $1.2 \times 10^3$ S/cm. Further, a large amount of acids is required in this process. As a result, there are caused many problems such as generation of $SO_x$ and $NO_x$ gases, corrosion of metals due to exudation of residual acids.

As described hereinabove, the second and the fourth processes of the conventional processes 1 through 4 can not provide graphite having properties similar to those of natural monocrystal graphite. On the other hand, the first and the third processes can provide graphite having properties almost similar to those of natural monocrystal graphite, but have disadvantages that the processes are complicated and the products are highly expensive. The fourth process also contains many problems in the process.

The problems of the second process, which can be most easily conducted, will hereinafter be further described in detail. In this process, there are usually used as starting materials a carbonaceous material such as coke or the like and a binder such as pitch, coal tar or the like, and sometimes various polymers. However, perfect graphite can not be obtained from these starting materials as already described, even if they are heat treated at a temperature of about 3000° C. For example, the electric conductivity of the product is usually in the range of 100 S/cm to 1000 S/cm, which is less than one-tenth that of perfect graphite.

With respect to the carbon structures produced at a temperature of about 3000° C., various kinds of these structures exist, from one closely resembling the graphite structure to one remotely resembling it. Carbon which can be relatively easily converted to a graphitic structure by the mere heat treatment in this way is called graphitizable (soft) carbon, and carbon which is not so is called non-graphitizable (hard) carbon. The cause for such a difference in the structure is closely related to the mechanism of graphitization, and depends on whether the structural defects present in the carbon precursor are easily removed by the succeeding higher heat treatment or not. Of course, on the production of graphite films, a raw material from which graphitizable carbon is most easily produced is selected. However, it is difficult to remove completely the induced structural defects by heating. Accordingly, it has not hitherto been achieved to produce a graphite film which has the properties similar to those of natural monocrystal graphite by a mere heat treatment. Therefore, the fine structure of the carbon precursor plays an important role to the graphitizing property.

Against these processes using coke or the like as the starting material, some studies have been carried out to produce graphitic films by heat treating polymeric materials. It has been considered that these studies intend to control the fine structure of the carbon precursor while efficiently using the molecular structure of the polymeric material. In this process, the polymeric material is heat treated in vacuo or in an inert gas, and through decomposition and polycondensation reaction, the carbonaceous material is formed. In this case, however, graphitic films are not necessarily obtained from all of the polymeric materials used as the starting materials. Most of the polymeric materials can not be used for this purpose. The reason thereof will be explained as follows.

The reaction pathways of the polymeric compounds on heating are generally classified into three types, namely (1) gasification by random decomposition or depolymerization, (2) carbonization via pitch-like melts, and (3) carbonization while maintaining their solid state.

In the case of the reaction pathway (1), evaporation and gasification produce only a little carbonaceous material. It is apparent, therefore, that this type of polymers may not be suitable for graphitization.

Many of the materials which follow the reaction pathway (2) belong to a class of graphitizable materials. When they are merely heated in a non-oxidizing gas, however, they are lost to a great extent by evaporation and gasification. For this reason, in general, they are preliminarily heated in the presence of oxygen, to cross link the polymer chains to each other with oxygen, and thereafter carbonized or graphitized. At the same time, however, this causes the polymeric materials originally belonging to a class of graphitizable materials to be converted to non-graphitizable materials. Accordingly, films having a structure close to perfect graphite can not be obtained from the polymers preliminarily treated with oxygen, even if they are heat treated subsequently at a temperature of at least 3000° C.

The reaction pathway (3), namely carbonization while maintaining the solid state, is most favorable from the viewpoint of the formation of the carbonaceous materials. However, most of the polymers which decompose through the pathway (3) are known to belong to a class of non-graphitizable materials and not to be capable of being converted to graphit films, even if they are heat treated at a temperature of at least 3000° C. That is to say, for the polymeric materials which can form graphitic films, it is necessary to satisfy both requirements that they form the carbonaceous material by the heat treatment and that they belong to a class of graphitizable materials. As the polymers attempted to be heat treated for such a purpose, there are mentioned phenolformaldehyde resins, polyacrylonitrile, cellulose, polyimides, polyparaphenylenes, polyparaphenylene oxides, polyvinyl chloride and the like. Since all of them belong to a class of non-graphitizable materials, any product having a high degree of graphitization has not yet been obtained. The sole problem of the process for heat treating these polymers is how to find out such a polymeric material that easily forms the graphite film.

SUMMARY OF THE INVENTION

The present invention has been completed for resolving several problems in the preparation of artificial graphite films and fibers described above. It is a primary object of the present invention to provide graphite films and fibers of good quality having properties similar to those of natural graphite and a high mechanical strength by an easy process that a polymer having a particular structure is heat treated in an inert gas or in vacuo.

In accordance with the present invention, there are provided (1) a process for producing a graphite film and fiber, which comprises heat treating a film or fiber of at least one polymer selected from the group consisting of a polyoxadiazole, polybenzothiazoles, a polybenzobisthiazole, a polybenzoxazole, a polybenzobisoxazole and a polythiazole, under tension, at a temperature of 400° to 700° C., in vacuo or in an inert gas, and then heat treating the film or fiber at a temperature of at least 1600° C. preferably at least 1800° C., in vacuo or in an inert gas, thereby graphitizing the film or fiber; and (2) a process for producing a graphite film, which comprises heat treating a film of at least one polymer selected from the group consisting of a polyoxadiazole, polybenzothiazoles, a polybenzobisthiazole, a polybenzoxazole, a polybenzobisoxazole, poly(pyromellitic acid imide), poly(m-phenylene isophthalic acid amide), poly(m-phenylenebenzoimidazole), poly(m-phenylenebenzobisimidazole) and a polythiazole at a temperature of at least 1800° C. in vacuo or in an inert gas, then impregnating the film with a binder component, and heat treating the impregnated film at a temperature of not more than 1400° C.

DESCRIPTION OF THE PREFERRED EMBODIMENTS

The structural formulas and abbreviations of polymers described above, which are employed as the starting materials in the process (1) of the present invention, are as shown in Table 1.

TABLE 1

| Name of polymer | Abbreviation | Structural formula |
| --- | --- | --- |
| Polybenzothiazole | PBT-1 | |
| Polybenzobisthiazole | PBBT | |

TABLE 1-continued

| Name of polymer | Abbreviation | Structural formula |
| --- | --- | --- |
| Polybenzoxazole | PBO | |
| Polybenzobisoxazole | PBBO | |
| Polybenzothiazole | PBT-2 | |
| Polybenzothiazole | PBT-3 | |
| Poly(p-phenyleneoxadiazole) | POD | |
| Polythiazole | PT | |

The process (1) of the present invention is characterized in that the above polymeric films are preliminarily heat treated under tension at a temperature of 400° to 700° C. in vacuo or in an inert gas, prior to the graphitizing treatment. The polymers such as POD and PBT, which are described in our patent specification filed on the same date, belong to a class of graphitizable materials, in spite of the carbonization in the solid phase. This is because these polymers are obtained as films originally having a high crystallinity or orientation and the orientation is maintained to some extent in even the carbon precursors formed by heat treating the films. Therefore, whether or not the graphitization easily proceeds by the succeeding heat treatment at elevated temperatures depends to what extent the carbon precursor formed in the range of lower temperatures can maintain the original orientation of the film. The preliminary heat treatment under tension of the present invention is a technique for allowing the original orientation of the film such as described above to be maintained in the carbon precursor as much as possible. The applied tension is desired to be as high as possible, without breaking the film. There is a simple method in which the polymeric film is preliminarily heat treated while being securely fitted on a frame made of stainless steel and so on. This method intends to apply tension to the polymeric film by utilizing the heat shrinkage stress, and is one of the most effective techniques in the heat treatment of the present invention.

In the production processes of the carbon fibers, the organic fibers have usually been preliminarily heat treated in the presence of oxygen. The object of such oxygen treatments is, however, to make the organic fibers infusible and to increase the yields of the carbon fibers. The preliminary heat treatment according to the present invention is different from the conventional oxygen treatments in object and technique. The preliminary heat treatment is carried out in the course of decomposition and carbonization process of the polymeric films or fibers. Therefore, the existence of oxygen is undersirable. The preliminary heat treatment performed in the presence of oxygen decreases the yield of the carbon precursor, and moreover causes the precursor to be converted to a non-graphitizable material. In the preliminary heat treatment process of the present invention, there may be used an atmosphere of vacuum or an inert gas such as argon, nitrogen, helium or the like, and the existence of hydrogen is also permitted. The temperature of the preliminary heat treatment may be defined as the temperature at which the polymer forms the carbon precursor by decomposition and recombination. In the case of the above polymers of the present invention, however, the temperature of the preliminary heat treatment is in the range of 400° to 700° C. At a temperature of less than 400° C., the carbonization of the polymer does not take place, and accordingly the heat treatment effect does not appear. It is unnecessary to heat treat at a temperature of more than 700° C.

The effect of such a preliminary heat treatment is estimated by heat treating at a high temperature the film or fibers preliminarily heat treated in practice and the films or fibers not preliminarily heat treated, under the same conditions, to graphitize them. This is the most direct estimating method. As a result of such a graphitization reaction, it was found that the graphitization reaction could be performed at a temperature lowered by at least 200° C. by the preliminary heat treatment.

The heat treatment for graphitization can be carried out under elevated pressure and in the presence of a catalyst, and thereby the graphitization can be enhanced.

The pressure applied is 2 Kb or more, preferably 5 Kb or more. As the catalyst, there can be used an element belonging to one of the groups IVb through VIIb and VIII of the periodic table, for example, a finely divided powder of Fe, Co, P, Sn, Ni, Sb or the like.

The process (2) of the present invention can not always be applied to all polymers, but limitedly applied to the polymers from which the polymeric films having a specific layer structure can be obtained when heat treated at a temperature of at least 1800° C. Utilizing these interlayers, a binder component is soaked between the layers, and then heat treated at an appropriate temperature, whereby interlayer bond becomes strong and the film has high strength. At present, therefore, the application of the process (2) of the present invention is limited to the polymers shown in Table 2. There are collectively shown in Table 2 the names, structural formulas and abbreviations of the polymers which are employed as starting raw materials in the process (2) of the present invention.

TABLE 2

| Name of polymer | Abbreviation | Structural formula |
|---|---|---|
| Poly(p-phenyleneoxadiazole) | POD | |
| Polybenzoxazole | PBO | |
| Polybenzobisoxazole | PBBO | |
| Polythiazole | PT | |
| Polybenzobisthiazole | PBBT | |
| Poly(pyromellitic acid imide) | PI | |
| Poly(m-phenylene isophthalic acid amide) | PA | |
| Poly(m-phenylenebenzoimidazole) | PBI | |
| Poly(m-phenylenebenzobisimidazole) | PBBI | |

TABLE 2-continued

| Name of polymer | Abbreviation | Structural formula |
|---|---|---|
| Polybenzothiazole | PBT-1 | (structure shown) |
| Polybenzothiazole | PBT-2 | (structure shown) |
| Polybenzothiazole | PBT-3 | (structure shown) |

Figure 1:
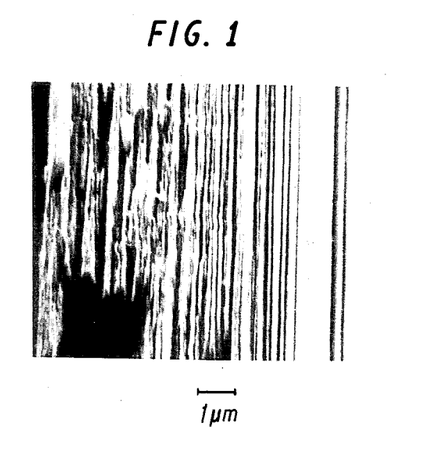
FIG. 1 is an electron microphotograph showing a layer structure of a graphite film formed by heat treating a poly(p-phenyleneoxadiazole) film at 2500° C. in argon.

In FIG. 1, an electron microphotograph shows a layer structure of a graphite film formed by heat treating a polyoxadiazole (POD) film at 2500° C. in argon, as an example of layer structures.

With respect to the polymers of the present invention, such a layer structure is usually formed at a temperature of at least 1800° C. It is necessary, therefore, to heat the starting film to a temperature of at least 1800° C. Actually, the film treated at a temperature of less than 1800° C. could not be impregnated with the binder, in spite of the impregnant treatment with the binder.

As the binder, there are mentioned carbonaceous materials, synthetic resins, fats and oils, metals, inorganic compounds and the like. Although pitch is mainly used as a carbonaceous material, a low viscosity substance such as tar, creosote oil, acenaphthene or the like may be incorporated therein, for controlling a degree of porosity.

As the synthetic resins, there can be widely employed epoxy resins, phenol resins, furfuryl alcohol resins, polyesters, polyvinylidene chloride, polydivinylbenzene, polyvinyl butyral and the like. The fats and oils include linseed oil, tung oil and the like, and the metals include white metals, copper, aluminum and the like. As the inorganic compounds, there are used phosphates, alumina, water glass and the like. The binder is selectively added in such an amount that the strength of the film is increased and the essential properties of the graphitized film are not lost. Although the amount in which the binder is permitted to be added varies with the kind of binder, it is usually suitable to be added in an amount of about 5 to 20% by weight, based on the graphite film. Although the secondary heating temperature also varies with the kind of binder, it is appropriately selected in the range of not more than 1400° C. in general. Temperatures of more than 1400° C. is not only unnecessary, but also weakens the binding force and causes the strength of the film to be lost, in some cases. When a synthetic resin is used as the binder, the heat treatment at elevated temperature is not required. In case of the polymers such as polyvinyl butyral, polyesters and polyvinylidene chloride, sufficient strength can be obtained only by drying at a temperature of 50° to 100° C. after impregration. The heating time is 10 minutes to 4 hours, preferably 30 minutes to 1 hour.

With an increase of the added amount of the binder, the original properties of the graphitized film can to be lost, as a matter of course. Accordingly, the property of the graphitized film is estimated here by determination of electric conductivity which can be most easily measured.

In order to indicate the extent of graphitization, parameters measured by X-ray diffraction such as lattice constant, crystallite size in the direction of C-axis and the like, and degree of graphitization calculated therefrom are usually used. Also, the value of electric conductivity is often utilized. The lattice constant is calculated from the position of the (002) diffraction line of X-ray. It is shown that the closer the constant is to 6.708 Å, which is the lattice constant of natural monocrystal graphite, the more the graphite structure is developed. The crystallite size in the direction of C-axis is calculated from the half breadth of the (002) diffraction line. It is shown that the larger the value thereof is, the more the planar structure of graphite is developed. The crystallite size of natural monocrystal graphite is at least 1000 Å. The degree of graphitization is calculated from the crystal face spacing ($d_{002}$) by the method described in the literature (Merig and Maire, Les Carbons, Vol. 1, page 129 (1965)). In the case of natural monocrystal graphite, of course, it shows 100%. The value of electric conductivity refers to the value in the direction of a-axis of graphite. As to natural monocrystal graphite, its electric conductivity is $1 \times 10^4$ to $2.5 \times 10^4$ S/cm. The larger value of electric conductivity shows the better approximation to the graphite structure.

According to the present invention, a film or fiber of at least one polymer selected from the group consisting of POD, PBT-1, PBT-2, PBT-3, PBBT, PBO, PBBO and PT is heat treated under tension at a temperature of 400° C. to 700° C. in vacuo or in an inert gas, and accordingly the film or fiber is converted to a heteroatom-containing condensed-polycyclic structure having the original orientation of the polymer. Thereafter, the heat treatment at a temperature of at least 1600° C. causes the hetero-atom of the condensed-polycyclic structure to be easily removed and hence to be easily graphitized.

Further, according to the present invention, a film of at least one polymer selected from the group consisting of POD, PBO, PBBO, PT, PBBT, PI, PA, PBI, PBBI, PBT-1, PBT-2 and PBT-3 is heat treated at a temperature of at least 1800° C. in vacuo or in an inert gas to be converted to a graphitized film, and then the film is impregnated with a binder, followed by the secondary heat treatment at a temperature of not more than 1400°

C. Thus, mechanical strength can be imparted to the graphitized film without a decrease in its properties.

In brief, as described above, the present invention relates to a process for producing a graphite film and fiber, which comprises heat treating a film or fiber of at least one polymer selected from the group consisting of a polyoxadiazole, polybenzothiazoles, a polybenzobisthiazole, a polybenzoxazole, a polybenzobisoxazole and a polythiazole, under tension, at a temperature of 400° to 700° C., in vacuo or in an inert gas, and then heat treating the film or fiber at a temperature of at least 1600° C., preferably at least 1800° C., in vacuo or in an inert gas. According to this process, almost perfect graphite film and fiber can be extremely easily obtained at a lower graphitization temperature, by the preliminary heat treatment at a low temperature. The present invention relates to, further, a process for producing a grpahite film, which comprises heat treating film of at least one polymer selected from the group consisting of a polyoxadiazole, polybenzothiazoles, a polybenzobisthiazole, a polybenzoxazole, a polybenzobisoxazole, poly(pyromellitic acid imide), poly(m-phenylene isophthalic acid amide), poly(m-phenylenebenzoimidazole), poly(m-phenylenebenzobisimidazole) and a polythiazole, at a temperature of at least 1800° C., in vacuo or in an inert gas, then impregnating the film with a binder component and heat treating again the impregnated film at a temperature of not more than 1400° C. According to this process, it becomes feasible to produce graphitic films having excellent electric conductivity and mechanical properties.

Graphite films and fibers obtained by the processes of the present invention can be widely utilized in electrodes, heating elements, structures, gaskets for high-temperature and high-pressure instruments, heat-insulating materials, corrosion-resistant sealing materials, brushes for electric applications, X-ray monochromators, reducers for atomic piles and the like.

The present invention will now be described in detail with reference to the following examples that by no means limit the scope of the invention.

The extent of graphitization is evaluated by the values of lattice constant, degree of graphitization, electric conductivity and the like.

The individual properties of graphite is measured according to the following procedures.

1. Lattice constant ($C_o$)

The X-ray diffraction line of the sample is measured by the Cu Kα-ray using a Phillips Model PW-1051 X-ray diffractometer. The value of $C_o$ is calculated from the (002) diffraction line which appears in the neighborhood of $2\theta$ equal to 26° to 27° by using the following Bragg's formula:

$$n\lambda = 2d \sin \theta$$

where $2d$ is equal to $C_o$, n is equal to 2, and $\lambda$ is the wavelength of X-ray.

2. Crystallite size ($L_c$)

Crystallite size ($L_c$) is calculated from the half breadth ($\beta$) of the diffraction line obtained by correcting the (002) diffraction line, according to the following relational formula:

$$L = \frac{K\lambda}{\beta \cdot \cos \theta}$$

where K is the shape factor.

3. Degree of graphitization (%)

Degree of graphitization is calculated from the value of face spacing (d) by using the following formula:

$$d_{002} = 3.354g + 3.44(1-g)$$

where g shows the extent of graphitizaiton, from the perfect graphite when g is equal to 1, to the amorphous carbon when g is equal to 0.

4. Electric conductivity (S/cm)

The sample is fitted with four-terminal electrodes by using silver paste and golden wires.

The value of electric conductivity is determined by applying the electric current to the outer electrodes and measuring the voltage drop at the inner electrodes, and further determining the width, length and thickness of the sample under a microscope.

5. Tensile strength and bending strength

Tensile strength and bending strength are measured by using Olsen universal testing machine, according to JIS R 7222.

EXAMPLE 1

25μ-thick POD films, each of which was securely fitted on a frame made of stainless steel, were preliminarily heat treated in argon by using a Sankyo Electric Furnace Model LTF-8 electric furnace, elevating the temperatures from room temperature to 700° C. at a rate of 10° C./min. The POD films contracted to 80% of the original dimension in the range of these temperatures, when not fitted on the frame of stainless steel. Therefore, the fitting of the films on the frame results in the preliminary heat treatment while applying tension. Each of the POD films thus preliminarily heat treated was sandwiched by graphite plates, and heat treated in a stream of argon at desired temperatures ($T_p$) for one hour, after the temperatures were increased at a rate of 10° C./min. The temperatures were then lowered at a rate of 20° C./min. A Shinsei Electric Furnace Model 46-1 electric furnace equipped with carbon heaters was employed for the heat treatment. The black films obtained at temperatures ($T_p$) of not higher than 1400° C. were brittle and free from flexibility. At temperatures ($T_p$) of at least 1800° C., however, the films having flexibility were obtained.

In Table 3, there are shown data of electric conductivity, lattice constant, crystallite size and degree of graphitization measured for POD films treated at various temperatures ($T_p$). Included in Table 3 for comparison are data of properties measured for POD films heat treated under the same conditions without the preliminary heat treatment.

TABLE 3

| Preliminary heat treatment | $T_p$ (°C.) | Lattice constant $C_o$ (Å) | Crystallite size $L_c$ (Å) | Degree of graphitization (%) | Electric conductivity (S/cm) |
|---|---|---|---|---|---|
| Applied | 1400 | 6.88 | 30 | 0 | 600 |
| Applied | 1600 | 6.86 | 70 | 11 | 880 |
| Applied | 1800 | 6.802 | 180 | 45 | 1300 |

TABLE 3-continued

| Preliminary heat treatment | $T_p$ (°C.) | Lattice constant $C_o$ (Å) | Crystallite size $L_c$ (Å) | Degree of graphitization (%) | Electric conductivity (S/cm) |
|---|---|---|---|---|---|
| Applied | 2000 | 6.760 | 610 | 70 | 2000 |
| Applied | 2200 | 6.722 | >1000 | 92 | 6000 |
| Applied | 2400 | 6.716 | >1000 | 95 | 7800 |
| Applied | 2600 | 6.710 | >1000 | 99 | 9900 |
| Applied | 2800 | 6.708 | >1000 | 100 | 14000 |
| Not applied | 1400 | 6.89 | 25 | 0 | 510 |
| Not applied | 1600 | 6.88 | 40 | 0 | 750 |
| Not applied | 1800 | 6.86 | 75 | 11 | 900 |
| Not applied | 2000 | 6.828 | 280 | 30 | 1400 |
| Not applied | 2200 | 6.756 | 850 | 72 | 2300 |
| Not applied | 2400 | 6.729 | >1000 | 88 | 5500 |
| Not applied | 2600 | 6.713 | >1000 | 97 | 8000 |
| Not applied | 2800 | 6.708 | >1000 | 100 | 10000 |

In the case of the POD films which were not preliminarily heat treated, graphitization is initiated at a temperature of at least 1800° C., and rapidly proceeds at a temperature of 2000° to 2500° C. Against this, in the case of the POD films which were preliminarily heat treated, graphitization is initiated at a temperature of at least 1600° C., and rapidly proceeds at a temperature of 1800° C. to 2200° C. At 2500° C., almost perfect graphite is obtained. The values of lattice constant, crystallite size and the like of this almost perfect graphite are similar to those of natural monocrystal graphite. That is to say, the graphitization reaction of the POD films can be performed at a temperature lowered by at least 200° C. by the preliminary heat treatment.

The similar results can be obtained also in the other inert gases or in vacuo.

EXAMPLE 2

Each films of PBT-1, PBT-2, PBT-3, PBBT, PBO, PBBO and PT, which were securely fitted on a frame of stainless steel, were preliminarily heat treated in argon, elevating the temperatures to 700° C. at a rate of 10° C./min, to be carbonized. The films contracted in the range of 400° to 700° C., when not fitted on the frame of stainless steel. Therefore, this results in the heat treatment under tension. The films thus preliminarily heat treated and the films not preliminarily heat treated were heat treated in the same manner as in Example 1 at each temperature of 1800°, 2200° and 2600° C. The results are shown in Table 4.

TABLE 4

| Polymer | Preliminary heat treatment | $T_p$ (°C.) | Lattice constant $C_o$ (Å) | Degree of graphitization (%) |
|---|---|---|---|---|
| PBT-1 | Applied | 1800 | 6.85 | 17 |
| | Applied | 2200 | 6.74 | 81 |
| | Applied | 2600 | 6.711 | 98 |
| | Not applied | 1800 | 6.88 | 0 |
| | Not applied | 2200 | 6.80 | 47 |
| | Not applied | 2600 | 6.728 | 88 |
| PBBT | Applied | 1800 | 6.82 | 35 |
| | Applied | 2200 | 6.727 | 89 |
| | Applied | 2600 | 6.710 | 99 |
| | Not applied | 1800 | 6.87 | 5 |
| | Not applied | 2200 | 6.78 | 58 |
| | Not applied | 2600 | 6.727 | 89 |
| PBO | Applied | 1800 | 6.83 | 29 |
| | Applied | 2200 | 6.730 | 87 |
| | Applied | 2600 | 6.710 | 99 |
| | Not applied | 1800 | 6.88 | 0 |
| | Not applied | 2200 | 6.762 | 69 |
| | Not applied | 2600 | 6.732 | 86 |
| PBBO | Applied | 1800 | 6.83 | 29 |
| | Applied | 2200 | 6.74 | 81 |
| | Applied | 2600 | 6.712 | 98 |
| | Not applied | 1800 | 6.89 | 0 |
| | Not applied | 2200 | 6.80 | 47 |
| | Not applied | 2600 | 6.779 | 88 |
| PBT-2 | Applied | 1800 | 6.82 | 35 |
| | Applied | 2200 | 6.762 | 69 |
| | Applied | 2600 | 6.713 | 97 |
| | Not applied | 1800 | 6.89 | 0 |
| | Not applied | 2200 | 6.82 | 35 |
| | Not applied | 2600 | 6.735 | 84 |
| PBT-3 | Applied | 1800 | 6.82 | 35 |
| | Applied | 2200 | 6.75 | 76 |
| | Applied | 2600 | 6.713 | 97 |
| | Not applied | 1800 | 6.89 | 0 |
| | Not applied | 2200 | 6.82 | 35 |
| | Not applied | 2600 | 6.732 | 86 |
| PT | Applied | 1800 | 6.80 | 47 |
| | Applied | 2200 | 6.732 | 86 |
| | Applied | 2600 | 6.714 | 97 |
| | Not applied | 1800 | 6.88 | 0 |
| | Not applied | 2200 | 6.80 | 47 |
| | Not applied | 2600 | 6.740 | 81 |

It is seen from the results shown in Table 4 that the degree of graphitization of the films preliminarily heat treated is significantly improved, compared with that of the films not preliminarily heat treated. This shows that the preliminary heat treatment under tension effectively acts on the films. Although data obtained when the films preliminarily heat treated were heat treated at 1600° C. are not shown in the table, the lattice constant and degree of graphitization of each polymer were calculated to be 6.86 Å and 11%, respectively. Usually, these polymers are not graphitized by the heat treatment at 1600° C. This shows, therefore, that the temperature at which the polymers are graphitized was lowered by the preliminary heat treatment.

EXAMPLE 3

25μ-thick POD films were heated in argon to 700° C. at a rate of 10° C./min while stretching them by a force of 400 kg/cm². The films thus preliminarily heat treated were heat treated at high temperatures of 2000° C. and 2400° C. The lattice constant and degree of graphitization of the film treated at 2000° C. were 6.77 Å and 64%, respectively. Further, the lattice constant and degree of graphitization of the film treated at 2400° C. were 6.718 Å and 94%, respectively. These values show that graphitization can obviously proceed with ease, compared with the films not preliminarily heat treated (see Table 3), and that the preliminary heat treatment under tension effectively acts on the films.

As described above, it is obvious from the results of Examples 1 through 3 that the polymeric films can be easily converted to the graphite films by the preliminary heat treatment at a temperature of 400° to 700° C. and the succeeding heating at a temperature of at least 1600° C., according to the present invention. When the graphitization reaction is achieved at elevated temperatures, the heat treatment under increased pressure, the heat treatment in the presence of a catalyst, the graphitization under tension or the like can be utilized, whereby the graphitizing temperature can be lowered. In the present invention, however, the preliminary heat treatment at low temperatures is applied, whereby the graphitization at elevated temperatures can be carried out in an inert gas, even under atmospheric pressure, and accordingly can be much more easily performed than the above-mentioned methods.

Also, with respect to fibers, excellent graphite fibers can be easily obtained by the similar procedure.

EXAMPLE 4

25μ-thick POD films, each of which was sandwiched by graphite substrates, were heat treated in an argon at 2800° C. for one hour, after the temperature was increased at a rate of 10° C./min. For this heat treatment, an electric furnace equipped with carbon heaters (Shinsei Electric Furnace Model 46-1 ultra high temperature furnace) was employed. The films thus obtained were once cooled to room temperature, and then impregnated with an initial polymer of furfuryl alcohol (Hitafuran 302 supplied by Hitachi Chemical Co., Ltd.). After curing the absorbed furfuryl alcohol by polymerization, the films were heat treated at 1000° C. for 40 minutes by using a Sankyo Electric Furnace Model UTF-8 electric furnace. After the heat treatment, the absorbed amounts of the binder component were determined by weight measurements. Thereafter, the electric conductivity, tensile strength and bending strength of the films were measured. The results thereof are shown in Table 5. It is understandable that the tensile strength and bending strength of the film can be extremely improved, without a decrease in the electric conductivity of the film, when the amount of binder is not more than 20% by weight based on the graphite film.

TABLE 5

| Amount of binder (% by weight) | Electric conductivity (S/cm) | Tensile strength (MPa) | Bending strength (MPa) |
| --- | --- | --- | --- |
| 0 | 10000 | 240 | 80 |
| 5.2 | 11000 | 600 | 400 |
| 10.3 | 10000 | 1000 | 500 |
| 20 | 9300 | 1200 | 510 |
| 33 | 6200 | 1300 | 530 |

EXAMPLE 5

POD films heat treated at 2800° C. in the similar manner as in Example 4 were impregnated with mixtures of acenaphthene and pitch at a temperature of 200° C. After the impregnation, the films were heated to 700° C. at a rate of 10° C./min, and then secondarily heat treated for 30 minutes, by using a Sankyo Electric Furnace Model UTF-8 electric furnace. By changing proportions of acenaphthene and pitch in the mixtures, the absorbed amounts of the mixtures were altered. There are shown in Table 6 data of electric conductivity, tensile strength and bending strength measured for the films thus prepared.

It can be seen that, also in the case that pitch is used as the binder, an improvement of mechanical strength similar to that of Example 4 is observed, and that its effect becomes remarkable when the added amount of the binder exceeds 5% by weight and, contrariwise, the electric conductivity is reduced when the added amount is 27% by weight.

TABLE 6

| Amount of binder (% by weight) | Electric conductivity (S/cm) | Tensile strength (MPa) | Bending strength (MPa) |
| --- | --- | --- | --- |
| 0 | 10000 | 240 | 80 |
| 1.3 | 10000 | 260 | 110 |
| 2.8 | 10000 | 260 | 140 |
| 5.2 | 10000 | 530 | 340 |
| 16 | 9600 | 870 | 490 |
| 27 | 7100 | 1000 | 520 |

EXAMPLE 6

Twelve polymers of POD, PBO, PBBO, PT, PBBT, PI, PA, PBI, PBBI, PBT-1, PBT-2 and PBT-3 were heat treated at 2500° C. in the same manner as in Example 4. The heat-treated films thus obtained were impregnated with mixtures of acenaphthene and pitch at a temperature of 200° C. After the impregnation, the secondary heat treatment was carried out by heating the films at 900° C. for 30 minutes, using a Sankyo Electric Furnace Model UTF-8 electric furnace. By changing proportions of acenaphthene and pitch in the mixtures, the absorbed amounts of the binder were altered. There are given in Table 7 data of electric conductivity, tensile strength and bending strength measured for the films thus prepared. It is understandable that the other polymers can also be impregnated with the binder, as is the case with POD, and that the impregnation of the binder component and the succeeding heat treatment cause the mechanical properties such as tensile strength and bending strength to be extremely improved. Further, it can be seen that the electric conductivity usually tends to decline when the absorbed amount of the binder exceeds about 20% by weight.

TABLE 7

| Polymer (Abbreviation) | Amount of binder (% by weight) | Electric conductivity (S/cm) | Tensile strength (MPa) | Bending strength (MPa) |
| --- | --- | --- | --- | --- |
| POD | 0 | 7500 | 270 | 90 |
|  | 4.8 | 7500 | 550 | 350 |
|  | 16 | 6200 | 890 | 510 |
| PBO | 0 | 2500 | 200 | 98 |
|  | 4.2 | 2600 | 610 | 290 |
|  | 18 | 1400 | 780 | 710 |
| PBBO | 0 | 2900 | 220 | 80 |
|  | 4.5 | 3000 | 540 | 320 |
|  | 19 | 1600 | 910 | 460 |
| PT | 0 | 1700 | 280 | 85 |
|  | 5.1 | 1600 | 510 | 340 |
|  | 20 | 1000 | 720 | 520 |
| PBBT | 0 | 2800 | 310 | 90 |
|  | 5.0 | 2800 | 750 | 270 |
|  | 17 | 1900 | 1010 | 440 |
| PI | 0 | 520 | 470 | 85 |
|  | 4.3 | 570 | 720 | 310 |
|  | 18 | 220 | 820 | 420 |
| PA | 0 | 1400 | 200 | 95 |
|  | 4.0 | 1500 | 600 | 310 |
|  | 16 | 1300 | 920 | 500 |
| PBI | 0 | 2800 | 350 | 100 |
|  | 5.3 | 2800 | 610 | 420 |
|  | 22 | 1700 | 970 | 670 |
| PBBI | 0 | 2900 | 340 | 100 |
|  | 4.8 | 3000 | 590 | 370 |
|  | 19 | 2100 | 940 | 850 |
| PBT-1 | 0 | 2700 | 310 | 85 |
|  | 4.7 | 2800 | 640 | 290 |
|  | 18 | 2000 | 890 | 610 |
| PBT-2 | 0 | 2300 | 270 | 100 |
|  | 5.0 | 2300 | 600 | 270 |
|  | 21 | 1900 | 910 | 590 |
| PBT-3 | 0 | 2200 | 240 | 75 |
|  | 4.2 | 2100 | 710 | 230 |

TABLE 7-continued

| Polymer (Abbreviation) | Amount of binder (% by weight) | Electric conductivity (S/cm) | Tensile strength (MPa) | Bending strength (MPa) |
| --- | --- | --- | --- | --- |
| | 16 | 1900 | 1020 | 520 |

EXAMPLE 7

POD films heat treated at 2800° C. in the similar manner as in Example 4 were impregnated with an epoxy resin (Sumiepoxy ELM-434, supplied by Sumitomo Chemical Co., Ltd.) by a conventional method. After the impregnation, the films were heat treated at 80° C. for 1 hour, at 150° C. for 1 hour, and finally at 170° C. for 1 hour, and thereby the epoxy resin was cured. There are given in Table 8 data of electric conductivity and tensile strength of the films thus prepared.

TABLE 8

| Amount of binder (% by weight) | Electric conductivity (S/cm) | Tensile strength (MPa) |
| --- | --- | --- |
| 0 | 7500 | 270 |
| 3.7 | 7400 | 350 |
| 12.6 | 6900 | 620 |

Graphitized films were impregnated in the similar manner as in Example 6 with other binders such as linseed oil, tung oil, epoxy resins, phenol resins, polyesters, polyvinylidene chloride, polydivinylbenzene, polyvinyl butyral, polyamides, polyimides, polyamideimides, white metals, phosphates, alumina and water glass, and then heat treated, whereby the similar results could be obtained.

What is claimed is:

1. A process for producing graphite film and fiber at a lower graphitization temperature, which comprises preliminarily heat treating a film or fiber of at least one polymer selected from the group consisting of a polyoxadiazole, polybenzothiazoles, a polybenzobisthiazole, a polybenzoxazole, a polybenzobisoxazole and a polythiazole, under tension, at a temperature of 400° to 700° C., in vacuo or in an inert gas, without the presence of oxygen, to convert the film or fiber to a hetero-atom-containing condensed-polycyclic structure having the orientation of the polymer, and then heat treating the film or fiber at a temperature of at least 1800° C., for at least 30 minutes, in vacuo or in an inert gas, thereby graphitizing the film or fiber to produce a film or fiber having an improved graphite content of at least 17%.

2. A process for producing a graphite film and fiber as claimed in claim 1, wherein the heat treatment for graphitization is carried out under increased pressure.

3. A process for producing a graphite film and fiber as claimed in claim 1, wherein the heat treatment for graphitization is carried out in the presence of an element belonging to one of the groups IVb through VIIb and VIII of the periodic table.

4. A process for producing high strength graphite film, which comprises heat treating a film of at least one polymer selected from the group consisting of a polyoxadiazole, polybenzothiazoles, a polybenzobisthiazole, a polybenzoxazole, a polybenzobisoxazole, poly(pyromellitic acid imide), poly-(m-phenylene isophthalic acid amide), poly(m-phenylenebenzoimidazole, poly(m-phenylenebenzobisimidazole) and a polythiazole, at a temperature of at least 1800° C., in vacuo or in an inert gas, to provide a film having a layered structure, then impregnating the interlayers of the film with a binder component in an amount of about 5–20% by weight of the film, and heat treating the impregnated film at a temperature of not more than 1400° C.

5. A process for producing high strength graphite film as claimed in claim 4, wherein the binder component is at least one member selected from the group consisting of a furfuryl alcohol resin, an epoxy resin, acenaphthene and pitch.

* * * * *